United States Patent
Cyman, Jr. et al.

(10) Patent No.: US 8,564,808 B2
(45) Date of Patent: Oct. 22, 2013

(54) SYSTEMS AND METHODS FOR PROCESSING OF VARIABLE DOCUMENTS

(75) Inventors: Theodore F. Cyman, Jr., Grand Island, NY (US); Paul Coniglio, East Amherst, NY (US); Benjamin E. Barnes, North Tonawanda, NY (US); Travis J. Galoppo, Grand Island, NY (US)

(73) Assignee: R. R. Donnelley & Sons Company, Chicago, IL (US)

( * ) Notice: Subject to any disclaimer, the term of this patent is extended or adjusted under 35 U.S.C. 154(b) by 1250 days.

(21) Appl. No.: 12/002,659

(22) Filed: Dec. 18, 2007

(65) Prior Publication Data

US 2009/0153905 A1 Jun. 18, 2009

(51) Int. Cl.
*G06F 3/12* (2006.01)

(52) U.S. Cl.
USPC .......... 358/1.15; 358/1.9; 358/1.13; 358/296; 715/200

(58) Field of Classification Search
USPC .................. 358/1.15, 1.9, 1.13, 296; 715/200
See application file for complete search history.

(56) References Cited

U.S. PATENT DOCUMENTS

| | | | |
|---|---|---|---|
| 4,430,668 A | 2/1984 | Miles, Jr. | |
| 4,477,833 A | 10/1984 | Clark et al. | |
| 4,709,246 A | 11/1987 | Piatt et al. | |
| 4,789,147 A | 12/1988 | Berger et al. | |
| 5,634,091 A | 5/1997 | Sands et al. | |
| 5,706,410 A | 1/1998 | Bagley et al. | |
| 5,796,411 A | 8/1998 | Cyman et al. | |
| 5,949,438 A | 9/1999 | Cyman et al. | |
| 5,960,164 A | 9/1999 | Dorfman et al. | |
| 5,995,721 A | 11/1999 | Rourke et al. | |
| 6,019,454 A | 2/2000 | Serra et al. | |
| 6,088,702 A | 7/2000 | Plantz et al. | |
| 6,088,710 A * | 7/2000 | Dreyer et al. .................. | 715/246 |
| 6,134,018 A * | 10/2000 | Dziesietnik et al. .......... | 358/1.15 |
| 6,243,172 B1 | 6/2001 | Gauthier et al. | |
| 6,256,104 B1 | 7/2001 | Rumph et al. | |
| 6,275,303 B1 | 8/2001 | Fukaya | |
| 6,327,599 B1 | 12/2001 | Warmus et al. | |
| 6,332,149 B1 | 12/2001 | Warmus et al. | |
| 6,353,483 B1 | 3/2002 | Laverty et al. | |
| 6,357,847 B1 | 3/2002 | Ellson et al. | |

(Continued)

FOREIGN PATENT DOCUMENTS

| CA | 2 287 011 | 3/2001 |
|---|---|---|
| EP | 917 042 | 5/1999 |

(Continued)

OTHER PUBLICATIONS

International Search Report and Written Opinion, International Application No. PCT/US008/04099 dated Jun. 11, 2008.

(Continued)

*Primary Examiner* — Paul F Payer
(74) *Attorney, Agent, or Firm* — McCracken & Frank LLC

(57) ABSTRACT

A method of processing an electronic version of a variable document for a recipient includes the steps of receiving the electronic version of the variable document for the recipient and rasterizing the electronic version into one or more rasterized images, wherein each rasterized image is assigned a unique identifier. The method further includes the step of generating a run instance for the recipient, wherein the run instance includes the unique identifiers of the one or more rasterized images.

25 Claims, 8 Drawing Sheets

(56) References Cited

U.S. PATENT DOCUMENTS

| | | |
|---|---|---|
| 6,381,028 B1 | 4/2002 | Gauthier |
| 6,396,593 B1 | 5/2002 | Laverty et al. |
| 6,446,100 B1 | 9/2002 | Warmus et al. |
| 6,540,315 B1 | 4/2003 | Nystrom et al. |
| 6,563,601 B1 | 5/2003 | Yamada et al. |
| 6,606,165 B1 | 8/2003 | Barry et al. |
| 6,608,697 B1 | 8/2003 | Schorr et al. |
| 6,633,890 B1 | 10/2003 | Laverty et al. |
| 6,789,879 B2 | 9/2004 | Khalid |
| 6,814,511 B2 | 11/2004 | Bhatti |
| 6,826,534 B1 | 11/2004 | Gupta et al. |
| 6,891,630 B1 | 5/2005 | Miyasaka et al. |
| 6,895,554 B2 | 5/2005 | Endress et al. |
| 6,898,601 B2 | 5/2005 | Amado et al. |
| 6,952,801 B2 | 10/2005 | Warmus et al. |
| 6,980,964 B1 | 12/2005 | Cocotis et al. |
| 6,981,214 B1 | 12/2005 | Miller et al. |
| 7,088,462 B2 | 8/2006 | Bhogal et al. |
| 7,168,784 B2 | 1/2007 | Donovan et al. |
| 7,454,162 B2 | 11/2008 | Segerer et al. |
| 2001/0048533 A1 | 12/2001 | Koana |
| 2002/0078012 A1 | 6/2002 | Ryan et al. |
| 2002/0149792 A1 | 10/2002 | Gauthier et al. |
| 2002/0152183 A1 | 10/2002 | Soares et al. |
| 2002/0165760 A1 | 11/2002 | Delurgio et al. |
| 2003/0002069 A1 | 1/2003 | Bhogal et al. |
| 2003/0023636 A1 | 1/2003 | Lee et al. |
| 2003/0154137 A1* | 8/2003 | Carroll et al. ............ 705/26 |
| 2003/0231328 A1 | 12/2003 | Chapin et al. |
| 2004/0008359 A1 | 1/2004 | Christiansen |
| 2004/0196496 A1* | 10/2004 | Klassen .............. 358/1.15 |
| 2004/0205462 A1 | 10/2004 | Levine |
| 2005/0063010 A1 | 3/2005 | Giannetti |
| 2005/0080750 A1 | 4/2005 | Carling et al. |
| 2005/0111044 A1 | 5/2005 | Giannetti |
| 2005/0111867 A1 | 5/2005 | Hatano |
| 2005/0125726 A1 | 6/2005 | Harper et al. |
| 2005/0216832 A1 | 9/2005 | Giannetti |
| 2005/0289461 A1 | 12/2005 | Amado et al. |
| 2006/0082814 A1 | 4/2006 | Gardner |
| 2006/0092198 A1 | 5/2006 | Conca et al. |
| 2006/0103689 A1 | 5/2006 | Vinas et al. |
| 2006/0107194 A1 | 5/2006 | Gale |
| 2006/0136307 A1 | 6/2006 | Hays et al. |
| 2006/0156232 A1 | 7/2006 | Giannetti et al. |
| 2006/0164679 A1* | 7/2006 | Kim et al. ............ 358/1.15 |
| 2006/0248454 A1 | 11/2006 | Giannetti |
| 2008/0037047 A1* | 2/2008 | Condon et al. ............ 358/1.13 |
| 2008/0278740 A1* | 11/2008 | Bird et al. ............ 358/1.15 |
| 2009/0033986 A1* | 2/2009 | Himpe ............ 358/1.15 |

FOREIGN PATENT DOCUMENTS

| | | |
|---|---|---|
| EP | 1 033 645 | 9/2000 |
| EP | 1 724 673 | 11/2006 |
| EP | 1498839 A3 | 6/2008 |
| EP | 1975772 A2 | 10/2008 |
| EP | 1975772 A3 | 1/2009 |
| EP | 1498839 B1 | 3/2011 |
| GB | 2387817 A | 10/2003 |

OTHER PUBLICATIONS

Search Report in European Application No. 08 00 5957 dated Dec. 22, 2008.

International Search Report and Written Opinion in PCT/US2008/013837 dated Mar. 19, 2009.

Response to Jun. 29, 2010 EPC Communication for corresponding European Patent Application No. EP2223266, dated Aug. 4, 2010, 9 pages.

EPC Communication for corresponding European Patent Application No. EP2223266, dated Mar. 24, 2011, 9 pages.

International Preliminary Report on Patentability for corresponding International Application No. PCT/US2008/004099, dated Oct. 8, 2009, 6 pages.

International Search Report and Written Opinion for corresponding International Application No. PCT/US2008/011562, dated Dec. 23, 2008, 13 pages.

International Preliminary Report on Patentability for corresponding International Application No. PCT/US2008/011562, dated May 25, 2010, 7 pages.

Response to Jun. 29, 2010 EPC Communication for corresponding European Patent Application No. EP2225709, dated Sep. 1, 2010, 2 pages.

International Preliminary Report on Patentability for corresponding International Application No. PCT/US2008/013837, dated Jun. 22, 2010, 6 pages.

* cited by examiner

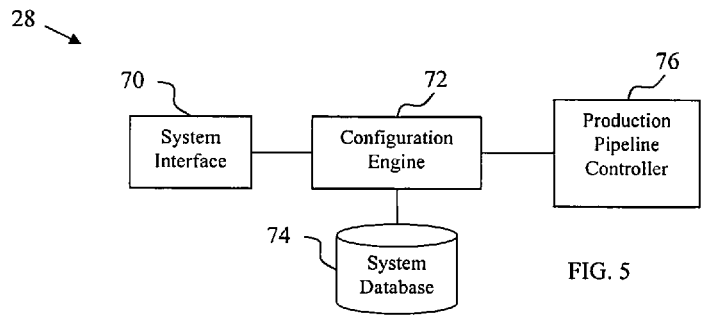
FIG. 4
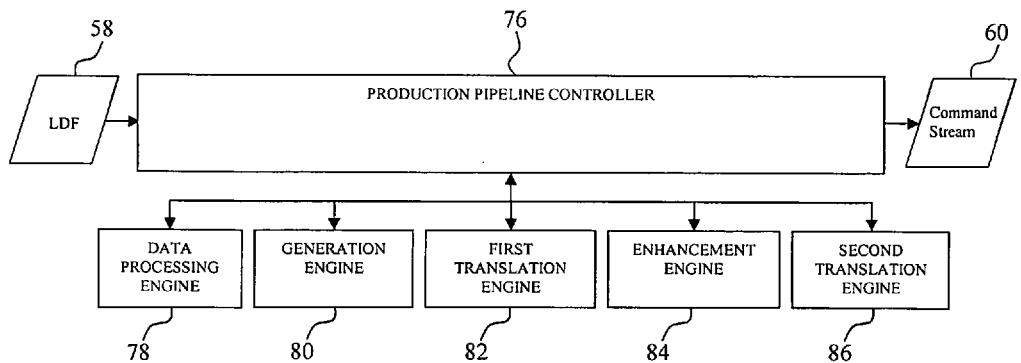
FIG. 5
FIG. 6

SYSTEMS AND METHODS FOR PROCESSING OF VARIABLE DOCUMENTS

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

The present invention relates generally to processing variable documents and, more particularly, to processing of electronic versions of variable documents to assemble print versions of the variable documents in an automated workflow.

2. Description of the Background of the Invention

When a merchant, such as product or service provider, completes a transaction with a customer, the merchant provides a post-transaction document to the customer. The document typically includes a "Thank You" message and provides the customer with a record of the transaction. Often, the merchant provides the document in an electronic format, e.g., attached to an email or through a website. In addition to the electronic version of the document, the merchant may also send a print version of the document to the customer. The merchant formats and prints the document and ensures that the print version is properly addressed and placed in the mail stream to the customer so that the customer receives the print version in a timely manner. In addition, the merchant must also ensure that the content of the print version is consistent with the electronic version so that the customer does not receive contradictory information.

As the number of customers increase, the management and production of the electronic and print versions of the document sent to the customers becomes increasingly complex and expensive. In addition, most merchants generally send a variety of documents to the customers, such as, periodic statements, upgrade offers, service updates, and advertisements, which further increases the complexity and expense of managing and producing the documents. In order to simplify and reduce the costs of managing and producing a variety of documents sent to numerous customers, the merchant keeps the electronic and print versions as simple and uniform as possible. Thus, the merchant is discouraged from personalizing the documents for each customer.

Alternatively or in conjunction, the merchant sends the electronic versions to the recipients and instructs a printing facility to manage the production and delivery of the print versions. In this workflow, the burden shifts from the merchant to the printing facility to ensure that the print version is synchronized with the electronic version and that the print version is properly printed and delivered. The merchant may personalize the documents for each customer by increasing the amount of variable information in the electronic and print versions of the documents. Such personalized documents can be developed using variable print software, such as, QuarkXPress®, developed by Quark, Inc. of Denver, Colo. While the printing facility is often better equipped to manage the production of the print versions, the same issues regarding the complexity of the print job and production volumes still arise. Further, the printing facility often manages print jobs for a number of clients and, therefore, must balance the needs of its clients with demands on equipment, such as presses and finishing devices.

In an example workflow, the merchant sends one or more variable templates and a database that includes variable information specific to each recipient, e.g., a name and an address, to a printing facility. When a print request is received, the printing facility processes the template(s) and the database to generate a command stream that includes data and instructions for assembling the variable document for each recipient. The command stream is further processed to generate rasterized images of print versions of the variable document and the rasterized images are produced by one or more presses at the printing facility and finished by the finishing devices. However, in general, the time it takes to process the command stream and to generate the rasterized images is far greater than the time it takes to produce the rasterized images with the press(es). This is especially true for large print jobs that include multiple pages with images, color, and text. Consequently, the processing time lags behind the production time and use of the equipment at the printing facility is not optimized. Further, it becomes difficult to further personalize the content and layout of the document for each customer after the rasterized images are generated, because the rasterized images represent the finished print versions of the document.

SUMMARY OF THE INVENTION

In one embodiment, a method of processing electronic documents for a plurality of recipients includes the steps of receiving a plurality of electronic documents for the plurality of recipients and rasterizing each of the plurality of electronic documents into one or more rasterized images. Each electronic document is associated with one of the plurality of recipients and includes first variable information associated with the recipient thereof In addition, each rasterized image is assigned a unique identifier. The method includes the further steps of generating a run instance for the plurality of recipients, merging the run instance with a template to generate a command stream, and assembling a print version of each of the plurality of electronic documents in accordance with the command stream and the rasterized images identified by the unique identifiers. The run instance includes the unique identifiers of the one or more rasterized images and second variable information associated with each recipient. Further, the print version of the electronic document associated with a recipient includes the second variable information associated with such recipient instead of the first variable information associated with the recipient.

In yet another embodiment, system for processing electronic documents for a plurality of recipients includes a server, one or more raster image processors, a print job management system, and a print server. The server is adapted to receive a plurality of electronic documents for the plurality of recipients, wherein each electronic document is associated with one of the plurality of recipients and includes first variable information associated with the recipient thereof. The one or more raster image processors are adapted to rasterize the electronic documents into one or more rasterized images, wherein each rasterized image is assigned a unique identifier. In addition, the server is adapted to generate a live data file wherein the live data file includes the unique identifiers of the rasterized images and second variable information associated with each recipient. The print job management system is adapted to merge the live data file with a template to generate a command stream. The print server is adapted to assemble print versions of the electronic documents in accordance with the command stream and the rasterized images identified by the unique identifiers, wherein the print version of an electronic document associated with a recipient includes the second variable information associated with such recipient instead of the first variable information for the recipient.

In a further embodiment, a method of processing electronic documents for a plurality of recipients includes the steps of receiving a plurality of electronic documents for the plurality of recipients and rasterizing each of the electronic documents into one or more rasterized images. Each electronic document is associated with one of the plurality of recipients and includes first variable information associated with the recipient thereof In addition, each rasterized image is assigned a unique identifier. The method includes the additional steps of receiving second variable information associated with each of the plurality of recipients, generating a run instance, and assembling a print version of each of the plurality of electronic documents in accordance with the run instance, a template, and the rasterized images. The run instance includes the unique identifiers of the one or more rasterized images. The print version of the electronic document for each recipient includes the second variable information associated with such recipient instead of the first variable information for the recipient.

In a still further embodiment, a system for processing electronic documents for a plurality of recipients includes a server, one or more raster image processors, a print job management system, and a print server. The server is adapted to receive a plurality of electronic documents associated with the plurality of recipients, wherein each electronic document is associated with one of the plurality of recipients and includes first variable information associated with the recipient thereof The one or more raster image processors are adapted to rasterize the electronic documents into one or more rasterized images, wherein each rasterized image is assigned a unique identifier. In addition, the server is adapted to receive second variable information and to generate a live data file wherein the live data file includes the unique identifiers of the rasterized images. The print job management system is adapted to merge the live data file with the first variable information associated with each of the plurality of recipients and a template to generate a command stream. The print server is adapted to assemble print versions of the plurality of electronic documents in accordance with the command stream and the rasterized images identified by the unique identifiers. The print version of the electronic document for each recipient includes the second variable information associated with such recipient instead of the first variable information associated with the recipient.

Other aspects and advantages of the present invention will become apparent upon consideration of the following detailed description.

BRIEF DESCRIPTION OF THE DRAWINGS

FIG. 4 is an index file according to an embodiment;

FIG. 5 is a block diagram that shows an embodiment of a print on command system;

FIG. 6 is a block diagram of an embodiment of a production pipeline controller of the print on command system of FIG. 5;

DETAILED DESCRIPTION OF THE PREFERRED EMBODIMENTS

Figure 1:
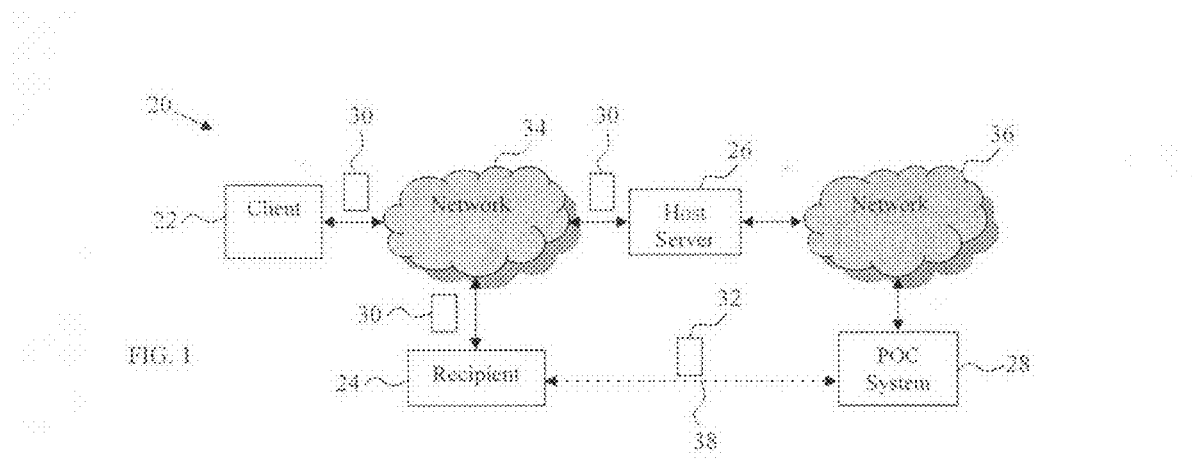
FIG. 1 is a block diagram that illustrates an embodiment of a system that processes electronic and/or print versions of a variable document sent to a recipient.

FIG. 1 shows a block diagram 20 that includes a client 22, a recipient 24, a host server 26, and a print job management system, which in one embodiment is referred to as a print on command ("POC") system 28. The client 22 sends an electronic version 30 of a variable document to the recipient 24. The client 22 also sends the electronic version 30 to the host server 26. The host server 26 and the POC system 28 process the electronic version to generate the print version 32 sent to the recipient 24. The client 22, the recipient 24, and the host server 26 communicate electronically via a network 34, which can be a public network such as the Internet or a private network, such as an intranet or a proprietary network. For example, electronic communications between the client 22 and the recipient 24 can be transferred over a public network using an email or a website. The host server 26 and the POC system 28 communicate electronically via a network 36, which can also be a public or private network. In one embodiment, the electronic communications between the host server 26 and the POC system 28 are transferred over a private network such as a local area network. In addition, FIG. 1 illustrates a physical communication channel 38 between the POC system 28 and the recipient 24, such as a mail service, through which the print version 32 of the variable document is delivered to the recipient.

Figure 2:
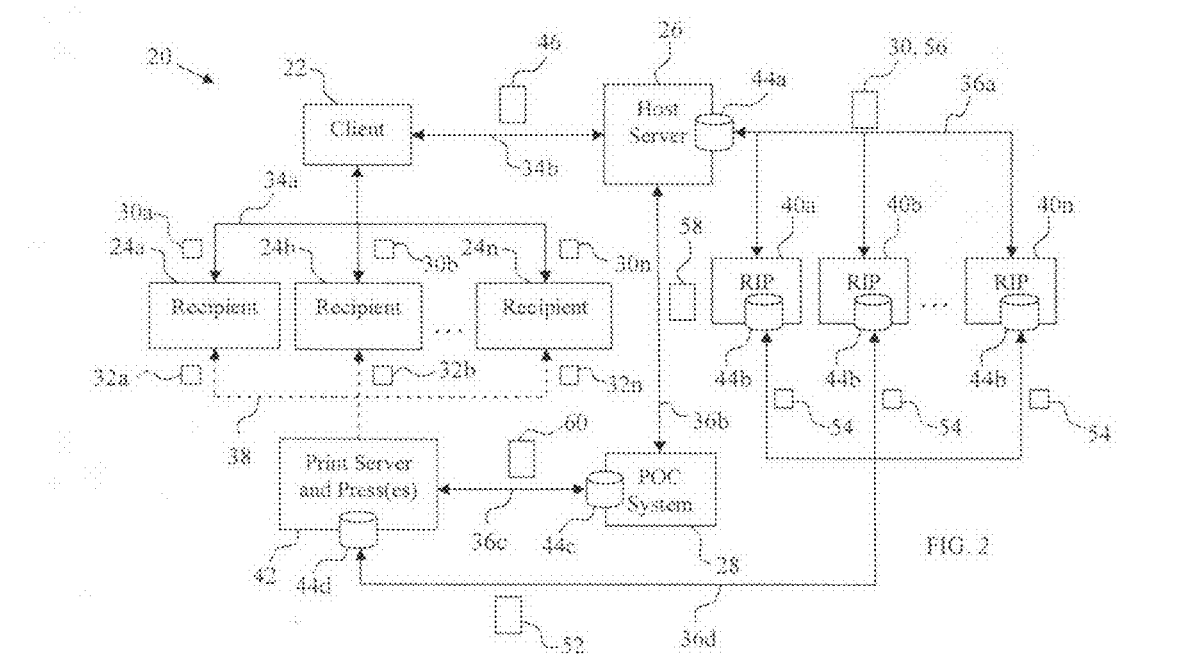
FIG. 2 is a block diagram of the system of FIG. 1 according to another embodiment.

Referring to FIG. 2, another embodiment of the block diagram 20 further includes one or more raster image processors ("RIP's") 40a-40n, a print server 42, and a plurality of recipients 24a-24n. Additional host servers 26, POC systems 28, RIP's 40, and/or print servers 42 can be integrated into the block diagram 20 as production needs grow. In addition, local memories 44a, 44b, 44c, 44d are associated with the host server 26, each of the RIP(s) 40, the POC system 28, and the print server 42, respectively. The local memories 44a-44d store electronic data such as rasterized images and fonts, compressed files, databases, variable templates, and other data in any form that would be apparent to one of ordinary skill in the art.

Figure 3:
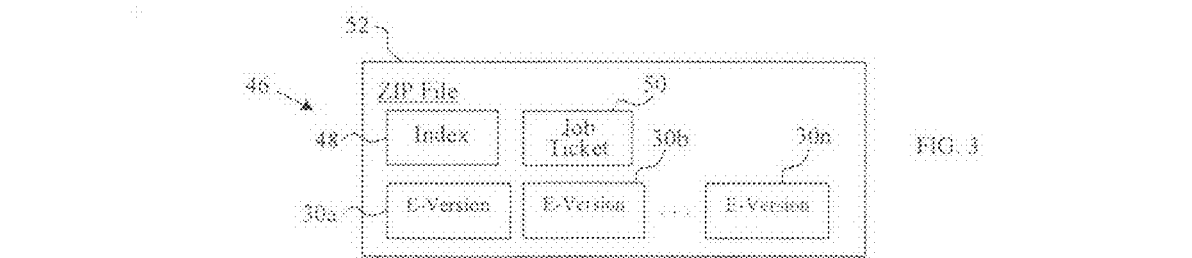
FIG. 3 is a block diagram according to an embodiment of an electronic file sent to a host server.

In FIG. 2, the client 22 provides electronic versions 30a-30n of the variable document to the recipients 24a-24n via a communication path 34a, e.g., through an email or a website. The client 22 also sends electronic files 46 to the host server 26 via a communication path 34b. Referring to the embodiment of FIG. 3, the electronic files 46 include the electronic versions 30a-30n of the variable document, an index file 48, and a job ticket 50. In FIG. 3, the electronic versions 30a-30n, the index file 48, and the job ticket 50 are compressed to reduce the size of the files and archived into one or more compressed files 52, e.g., a ZIP or RAR file. The index file 48 contains variable information specific to each recipient 24 and further identifies the electronic version 30 of the variable document for each recipient. The job ticket 50 defines the layout and finishing requirements of the print versions 32 and specifies a production schedule. Alternatively, the layout and finishing requirements and/or production schedule can be provided to the host server 26 in any manner apparent to one or ordinary skill in the art. In other embodiments, the electronic versions 30a-30n, the index file 48, and the job ticket 50 can be grouped differently and/or sent separately to the host server 26. In addition, the electronic files 46 can be sent in either compressed or uncompressed formats.

FIG. 4 illustrates an example of the index file 48 that includes an entry for each of two recipients 24, wherein each entry includes the recipient's first and last name, street address, ZIP Code, and a file name of the electronic version 30 of the variable document for the recipient. In other embodiments, the index file 48 can include fewer entries or additional entries and other recipient specific information, e.g., a phone number, a sales channel, specific contents of the electronic version 30 for each recipient, and other information as would be apparent to one of ordinary skill in the art.

Referring back to FIG. 2, the host server 26 sends the electronic versions 30a-30n of the variable document to the RIP(s) 40a-40n via a communication path 36a. The host server 26 manages the RIP(s) 40a-40n to rasterize the electronic versions 30a-30n into rasterized images 54. Each rasterized image 54 is stored and is assigned a unique identifier or name, such as a global unique identifier ("GUID") 56. In the present embodiment, the rasterized images 54 are stored in the local memory 44b associated with the RIP 40 that generated the rasterized image and the GUID's 56 are sent via the communication path 36a to the host server 26, which manages the GUID's, e.g., in a database, list, or folder. Each GUID 56 uniquely identifies the associated rasterized image 54 and the location where the rasterized image is stored, e.g., the RIP 40 that generated the rasterized image. During a print run, the print server 42 uses the GUID's 56 to locate and retrieve the rasteried images 54. In one embodiment, each GUID 56 is a uniform resource identifier in any known syntax, such as, file://<RIP>/<file name>/.<portion> (e.g., file://RIP40a/Doc1/1.1). In an alternative embodiment, each GUID 56 is stored as one or more table entries that identify the network address of the RIP 40 and a full-path name of the rasterized image 54. In other embodiments, the GUID's 56 can be in any other form that would be apparent to one of ordinary skill in the art.

The host server 26 also initiates the print run for the print versions 32 of the variable document for a batch of recipients 24 at a time specified by the job ticket 50. In the present embodiment, the batch of recipients 24 are those recipients whose electronic versions 30 of the variable document have been rasterized, stored, and assigned GUID's 56 at the time the print run is initiated. At the specified time, the host server 26 generates a run instance for the batch of recipients 24 and sends the run instance to the POC server 28 via a communication path 36b. In one embodiment, the run instance is referred to as a live data file ("LDF") 58, wherein the LDF includes an entry for each recipient 24 in the batch and variable information specific to each recipient in the LDF. The variable information in the LDF 54 includes, for example, the name and address of the recipient 24 and the GUID's 56 of the rasterized images 54 that correspond to the electronic version 30 for the recipient. The entries can also include other variable information as would be apparent to one of ordinary skill in the art.

The POC system 28 receives the LDF 58 from the host server 26 via the communication path 36b and generates a command stream 60 for the batch of recipients 24. More particularly, the POC system 28 generates the command stream 60 by merging a variable template (not shown) and the variable information specific to each recipient in the LDF 58. The command stream 60 includes the GUID's 56 from the LDF 54 for the batch of recipients 24 and instructions for assembling the print versions 32 of the variable document for the batch of recipients. The POC system 28 sends the command stream 60 to the print server 42 via a communication path 36c. The print server 42 uses the GUID's in the command stream 60 to identify the RIP(s) 40 where each of the rasterized images 54 for the batch of recipients 24 is stored. Thereafter, the print server 42 retrieves the rasterized images 54 from the RIP(s) 40 via a communication path 36d and stores the retrieved rasterized images in the local memory 44d. Using the retrieved rasterized images 54, the print server 42 assembles the print versions 32 for the recipients in accordance with the command stream 60. Generally, the print versions 32 are assembled in the order that they are to be printed, i.e., in a printer spread order. However, the printer spread order can be inside out, outside in, or any other order depending on the requirements of the finishing equipment. Generally, inside out order starts with the center spread or center of a booklet and ends with the cover. In contrast, outside in order starts with the cover and ends with the center spread. The print server 40 subsequently instructs one or more presses to produce the assembled print versions 32 of the variable document. The press(es) can operate at full press speed when producing the print versions 32a-32n because the majority of the contents in the electronic versions 30 have already been processed into rasterized images 54 by the RIP(s) 40 before the print run is initiated. After the print versions 32 of the variable document have been produced, they are delivered to the batch of recipients 24, e.g., through a mail stream 38.

In a different embodiment, the recipients 24 receive the print versions 32 of the variable document in lieu of the electronic versions 30. For example, some recipients 24 may request only the print version 32 because they may not have access to a computer or may simply prefer only the print version instead of receiving what they consider superfluous or junk email.

An embodiment of the POC system 28 shown in FIG. 5 includes a system interface 70, a configuration engine 72, a system database 74, and a production pipeline controller 76. The system interface 70 allows a production coordinator (not shown) to access the POC system 28 and manage the processing of the electronic versions 30 and the production of the print versions 32 of the variable document. The configuration engine 72 uses information stored in the system database 74 to identify printing and finishing devices within one or more printing facilities that can be used to produce the print versions 32. The production pipeline controller 76 receives the LDF 58 and develops the command stream 60 that is sent to the print server and the press(es) 42.

Referring to FIG. 6, an embodiment of the production pipeline controller 76 includes a data processing engine 78, a generation engine 80, a first translation engine 82, an enhancement engine 84, and a second translation engine 86. Each of the engines 78-86 of the production pipeline controller 76 are configured to perform some processing to develop the command stream 60 sent to the print server 42. The data processing engine 78 is used to cleanse, format, sort, and enhance information about the recipients 24, e.g., the variable information specific to each recipient in the LDF 58. The generation engine 80 merges data from the data processing engine 78, e.g., the cleansed LDF 58, with a variable template (not shown). The generation engine 82 can perform the merge process using any known method or software tool, for example, Exstream or GMC PrintNet, which are commercially available document generation tools. The first and second translation engines 82, 86 translate the command stream 60 into a format compatible with subsequent steps and/or into a format used by the print server and press(es) 42. The enhancement engine 84 adds information, such as marketing collateral, auditing data, control information, and other variable data to the command stream 60. The POC server 28 and the production pipeline controller 76 of FIGS. 5 and 6, respectively, can be modified in any manner that would be apparent to one of ordinary skill in the art without deviating from the principles described herein.

By way of non-limiting example, the client 22 is a product or service provider, such as a cellular service provider, and the recipients 24 are customers that subscribe to receive cellular service from the provider. Typical transactions include the provider signing up a new customer and renewing the subscription of an existing customer. Such transactions are completed when the customer signs or otherwise agrees to a service contract and the provider activates the customers' cellular service. When the transaction is completed, or shortly thereafter, the provider sends confirmation of the transaction to the customer in the form of a welcome kit (i.e., the variable document). The confirmation is typically sent to the customer in an electronic version 30 and/or a print version 32. The electronic version 30 can be a file in any suitable format, e.g., PDF, emailed to the customer and/or accessed by the customer through a website. In one embodiment, the provider sends an email to the customer that instructs the customer to log onto a secure website to view the welcome kit. An email or secure website provides access to the welcome kit and helps protect the privacy of the customer. However, in other embodiments, the welcome kit can be provided to the customer in any manner known to one of ordinary skill in the art, whether secure or unsecure.

Typically, the welcome kit includes a welcome message that thanks the customer for subscribing to the cellular service and information that specifies the terms and conditions of the service plan. For returning customers, a usage summary of minutes and text messages can also be included. Further, the welcome kit can include additional content that relates to plan upgrades, special offers, advertisements, disclaimers, warranties, and FAQ's, for example. Each welcome kit also includes variable content for each customer, such as the name and address of the customer and the terms and conditions of the service plan. The welcome kits can be further customized by selectively including such additional content referred to above, e.g., upgrades, special offers, or advertisements, based on the customer's demographic, by the customer's request, or any other basis that would be apparent to one of ordinary skill in the art.

Figure 7:
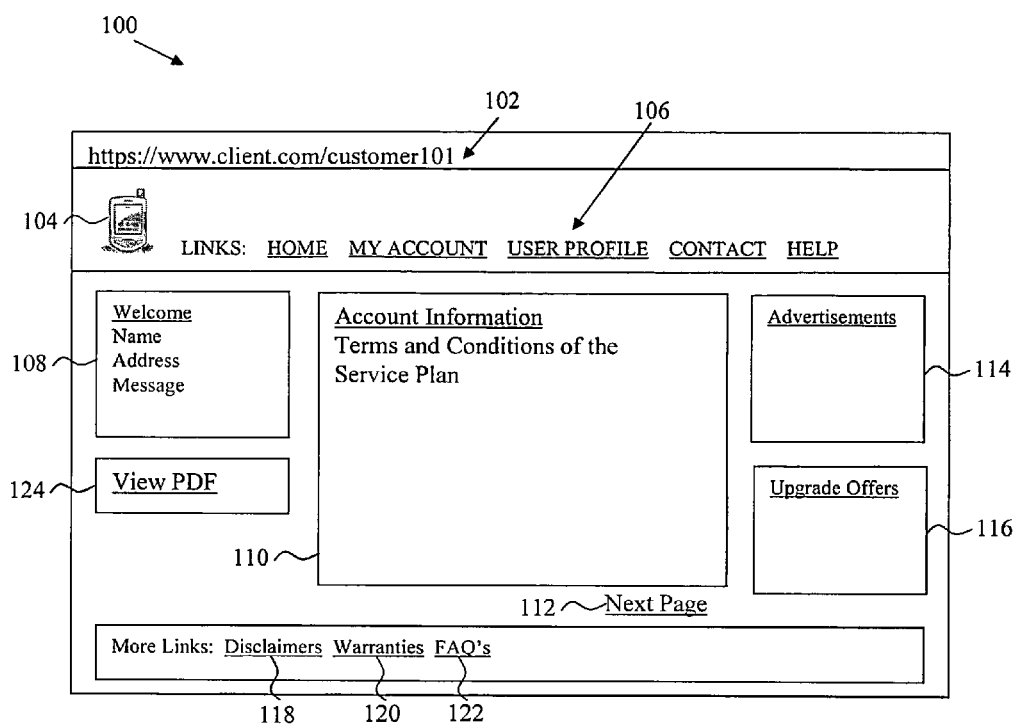
FIG. 7 is an elevational view of an electronic version of a variable document according to one embodiment.
Figure 8:
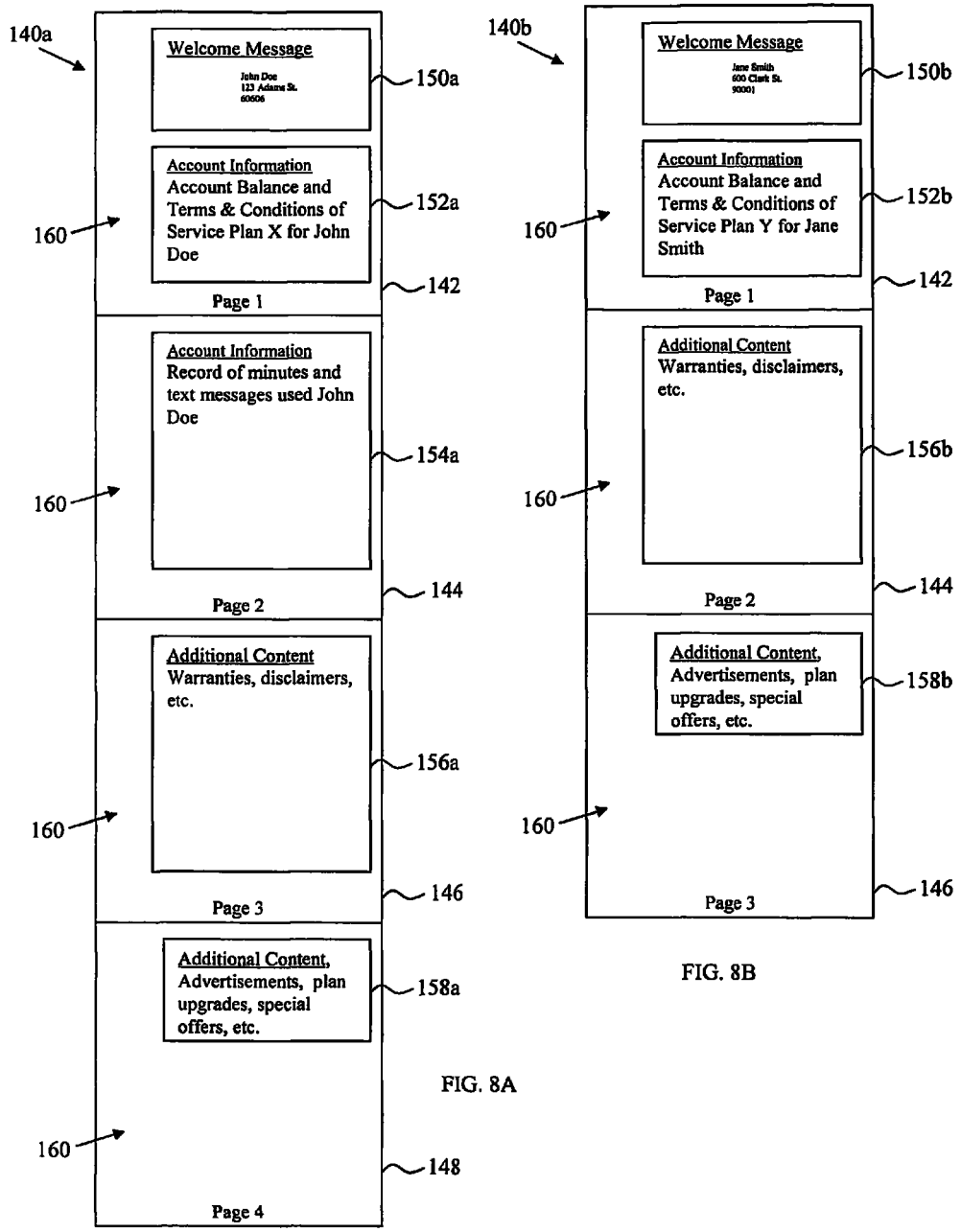
FIG. 8A is an elevational view of an electronic version of a variable document according to another embodiment for a first recipient.
FIG. 8B is an elevational view of an electronic version of the variable document of FIG. 8A for a second recipient.

FIGS. 7, 8A, and 8B demonstrate embodiments of the electronic version 30 of the welcome kit provided to the customers. FIG. 7 illustrates a generic website 100 where the customer can view the electronic version 30 of the welcome kit. The website 100 is divided into a plurality of portions. Some of the portions contain general content, while other portions contain specific content relevant to the welcome kit for the customer. For example, the general content portions include a URL 102 for the website 100, a client logo 104, and various links 106. Specific content portions include a "Welcome" portion 108, which identifies the customer's name and address and includes a welcome message. Further, an "Account Information" portion 110 includes such information as the terms and conditions of the customer's service plan and the customer's balance information. A "Next Page" link 112 allows the customer to access other "Account Information" portions (not shown). The website 100 also includes an "Advertisements" portion 114, an "Upgrade Offers" portion 116, and links to "Disclaimers" 118, "Warranties" 120, and "FAQ's" 122. A "View PDF" link 124 is also included, which allows the customer to view a PDF file of the welcome kit.

FIGS. 8A and 8B illustrate examples of electronic versions 30 of the welcome kit in the form of a first PDF file 140a in FIG. 8A customized for first recipient, John Doe, and a second PDF file 140b in FIG. 8B customized for a second recipient, Jane Smith. Specifically, the PDF file 140a for John Doe includes four pages 142, 144, 146, 148 with a "Welcome" portion 150a and a first "Account Information" portion 152a on the first page 142, a second "Account Information" portion 154a on the second page 144, a first "Additional Content" portion 156a on the third page 146, and a second "Additional Content" portion 158a on the fourth page 148. The "Welcome" portion 150a includes the first recipient's name, street address, and ZIP Code, i.e., John Doe, 123 Adams St., and 60606, respectively. The first "Account Information" portion 152a is also customized for John Doe and includes such information as an account balance, monthly charges, taxes due, amount due, and specific details of a service plan "X" for John Doe, e.g., 600 minutes per month and 200 text messages. The second "Account Information" portion 154a includes a usage summary of minutes and text messages for John Doe. The first "Additional Content" portion 156a includes such information as warranties and disclaimers and the second "Additional Content" portion 158a includes such information as advertisements, plan upgrades, and special offers.

The PDF file 140b for Jane Smith is similar to the PDF file 140a for John Doe, but includes three pages 142, 144, 146 with a "Welcome" portion 150b and a first "Account Information" portion 152b on the first page 142, a first "Additional Content" portion 156b on the second page 144, and a second "Additional Content" portion 158b on the third page 146. The "Welcome" portion 150b includes the second recipients name, street address, and ZIP Code, i.e., Jane Smith, 600 Clark St., and 90001. In addition, the first "Account Information" portion 152b is also customized for Jane Smith and includes such information as an account balance, monthly charges, taxes due, amount due, and specific details of a service plan "Y" for Jane Smith, e.g., 400 minutes per month, unlimited text messages, and nights starting at 7:00 pm. Further, the first "Additional Content" portion 156b includes such information as warranties and disclaimers and the second "Additional Content" portion 158b includes such information as advertisements, plan upgrades, and special offers.

In the above example, John Doe has renewed his subscription with the service provider and Jane Smith is a new customer. Further, John Doe and Jane Smith are signed up for different service plans. Consequently, the PDF files 140*a*, 140*b* contain variable content such as a name, an address, and account information specific to each recipient. The variable content for each recipient can also result in different layouts of the welcome kits. In FIG. 8B, because Jane Smith is a new customer, the PDF file 140*b* of her welcome kit does not include a usage summary of minutes and text messages. Consequently, the PDF file 140*b* includes three pages 142-146 compared to the four pages 142-148 of John Doe's PDF file 140*a* in FIG. 8A. One of ordinary skill in the art would also recognize that the "Additional" content portions 156*a*, 156*b*, 158*a*, 158*b* can be the same for each recipient 24 or can include variable content specific to each recipient. For example, the "Additional" content portions for a new customer such as Jane Smith can include FAQ's, payment options, additional warranties, information regarding a free trial period, and the like, that would not be included in the welcome kit for a returning customer.

The PDF files 140*a*, 140*b* are formatted to print in simplex on letter-size paper (8.50×11.0 inches; 21.6×27.9 cm), which is the typical paper size available in offices and homes, so that a customer can print the welcome kit without reformatting. However, the print version 32 of the welcome kit mailed to the customer may be printed on sheets that have different length and width dimensions than letter-size paper. FIG. 8A shows such an example, where the "Welcome" portion 150*a*, the first and second "Account Information" portions 152*a*, 154*a*, and the first "Additional Content" portion 156*a* are formatted to print on paper that has dimensions of 7.00×11.0 inches (17.8× 27.9 cm). In addition, the second "Additional Content" portion 158*a* is formatted to print on paper that has dimensions of 6.50×3.25 inches (16.5×8.26 cm). As a result, the PDF file 140*a* of the welcome kit includes empty white space 160 on each page 142-148 and on the back of each page (not shown). The PDF file 140*b* for Jane Smith is similarly formatted, i.e., the "Welcome" portion 150*b*, the first "Account Information" portion 152*b*, and the first "Additional Content" 156*b* are formatted to print on 7.00×11.0 inch (17.8×27.9 cm) paper and the second "Additional Content" portion 158*b* is formatted to print on 6.50×3.25 inch (16.5×8.26 cm) paper. The PDF files 140*a*, 140*b* with the empty white space 160 may be appropriate for a single recipient 24 to print. However, the client 22 may print and/or instruct a printing facility to be print hundreds or thousands of the welcome kits, wherein reformatting of the print version 32 would be desirable to eliminate or make use of the empty white space 160 (e.g., by adding content) and thus reduce the amount of paper used.

In other embodiments, the PDF file 140 of the electronic version is formatted to print on letter-size paper (8.50×11.0 inches; 21.6×27.9 cm) while the print version 32 of the welcome kit is printed on paper that has larger dimensions than letter-size paper. For example, the print version 32 of the welcome kit mailed to the recipient 24 can be formatted to print on 7.00×14.0 inch (17.8×35.6 cm) paper. In this example, the content portions of the PDF file 140 would either be reduced in size, e.g., by reducing the font size, or would otherwise be formatted to fit on letter-size paper, e.g., by rearranging the images and/or lines of text, so that a recipient 24 could easily print the welcome kit. When the print version 32 is printed on the larger 7.00×14.0 inch (17.8×35.6 cm) paper by the client 22 and/or printing facility, the various portions would then be enlarged to their original size and/or reformatted. Such formatting and page design techniques are within the knowledge of a person of ordinary skill in the art and could be performed using any known method.

Figure 9:
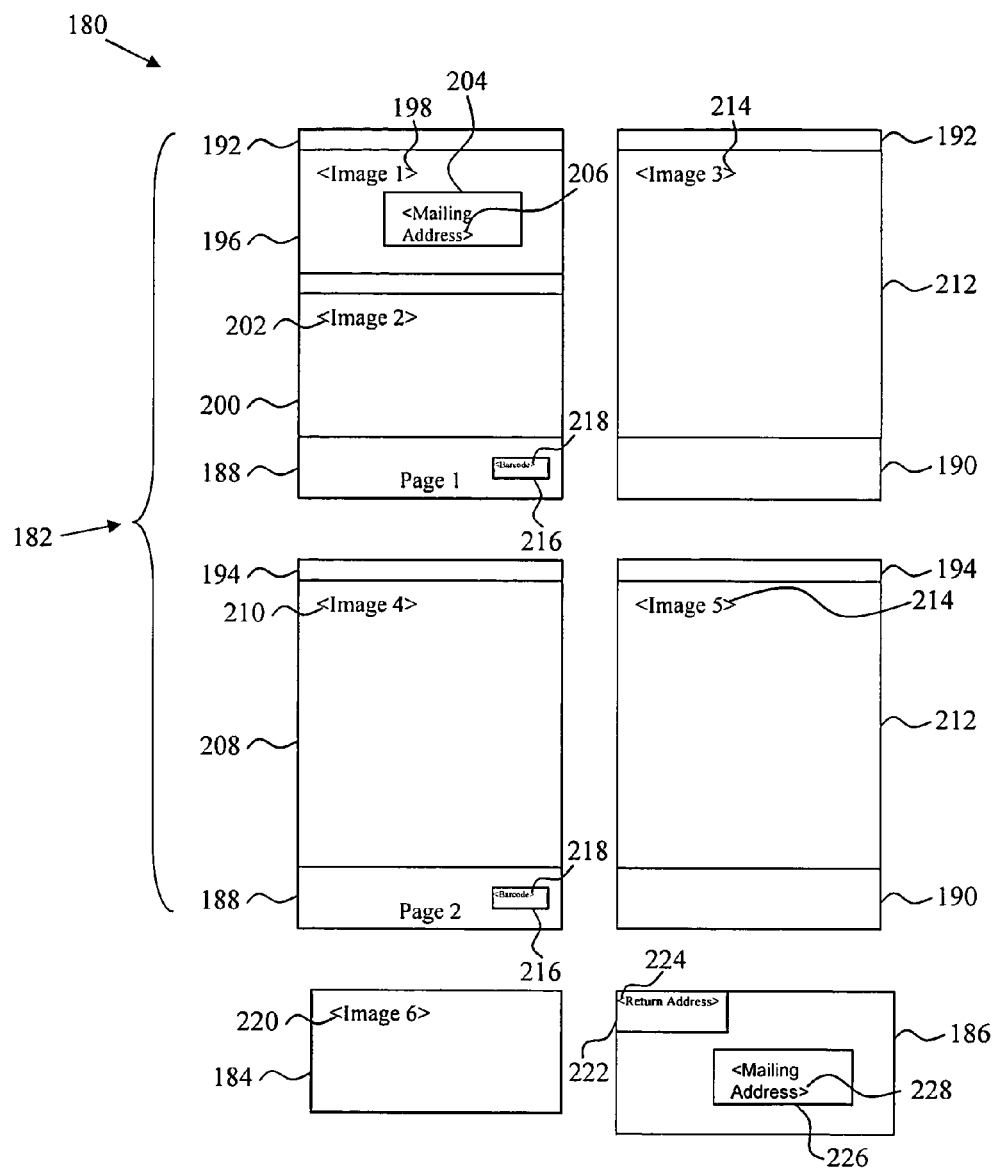
FIG. 9 is an elevational view of an embodiment of a variable template.

FIG. 9 illustrates an embodiment of a variable template 180 that corresponds to the PDF files 140*a*, 140*b* shown in FIGS. 8A and 8B. The variable template 180 includes various parts that define the pages of the print versions 32 of the welcome kit. The parts include a variable document 182, an insert 184, and an original mailing envelope ("OME") 186. The variable template is formatted to print on the proper paper size, i.e., the variable document 182 is formatted to print on 7.00×11.0 inch (17.8×27.9 cm) paper, the insert 184 is formatted to print on 6.50×3.25 inch (16.5×8.26 cm) paper, and the OME is formatted to print on an 7.25×4.00 (18.4×10.2 cm) envelope. Further, the content portions of the welcome kit are arranged to eliminate much of the empty white space 160 from the PDF files 140*a*, 140*b* of FIGS. 8A and 8B.

In the present embodiment, the content portions of the welcome kit are arranged to print on the insert 184 and in duplex on front and back sides 188, 190, respectively, of first and second sheets 192, 194, respectively, of the variable document 182. More specifically, the front side 188 of the first sheet 192 has a first portion 196 that includes a placeholder 198 for a rasterized image of a "Welcome" portion 150 and a second portion 200 that includes a placeholder 202 for a rasterized image of a first "Account Information" portion 152. In addition, the first portion 196 on the front side 188 of the first sheet 192 has an additional portion 204 that includes a placeholder 206 for variable data, e.g., a mailing address that is normalized to standard addressing formats. In the present embodiment, the additional portion 204 blocks out an area of the first portion 196 that corresponds to the recipient's name and address. In this manner, areas of the rasterized images 54 that make up the print versions 32 of the welcome kit can be blocked out and replaced with variable data and/or other rasterized images. Further, the front side 188 of the second sheet 194 has a portion 208 that includes a placeholder 210 for a rasterized image of a second "Account Information" portion 154. Each of the back sides 190 of the first and second sheets 192, 194, respectively, has a portion 212 that includes a placeholder 214 for a rasterized image of a first "Additional Content" portion 156. In addition, each of the front sides 188 of the first and second sheets 192, 194, respectively, has a portion 216 that includes a placeholder 218 for variable data, e.g., a barcode used for control purposes and error reporting. The insert 184 includes a placeholder 220 for a rasterized image of a second "Additional Content" portion 158 and the OME 186 has a first portion 222 that includes a placeholder 224 and a second portion 226 that includes a placeholder 228 for variable data, e.g., a return address and a mailing address, respectively.

In a different embodiment, the OME 186 includes a transparent window (not shown) in place of the second portion 226 and the placeholder 228. In this embodiment, the additional portion 204 is arranged in the first portion 196 so that the additional portion 204 aligns with the transparent window on the OME 186 when the variable document 182 is folded and inserted into the OME. Consequently, the placeholder 206 provides the mailing address for the print version 32 of the welcome kit.

The variable template 180 of FIG. 9 is laid out such that if there is no rasterized image of the second "Account Information" portion 154 that corresponds to the placeholder 210, then the second page 194 is omitted from the print version 32 of the welcome kit. Similarly, if there is no rasterized image of the second "Additional Content" portion 158 that corresponds to the placeholder 220, then the insert 184 is omitted from the print version 32 of the welcome kit.

In other embodiments, the variable template 180 can be modified in any manner apparent to one of ordinary skill in the art. For example, the variable template can include fewer parts or additional parts, e.g., additional pages of the variable document 182, multiple inserts 184, and/or a business reply envelope (not shown). Such additional parts could include placeholders and could be included or omitted in the print versions 32 of the welcome kit for each recipient 24 based on the presence of corresponding rasterized images as described above. In another example, each of the first and second sheets 192, 194 can be preprinted on the back sides 190 with warranties and disclaimers. Consequently, the portions 212 and the placeholders 214 on the back sides 190 of the first and second sheets 192, 194, respectively, can be omitted.

Figure 10A:
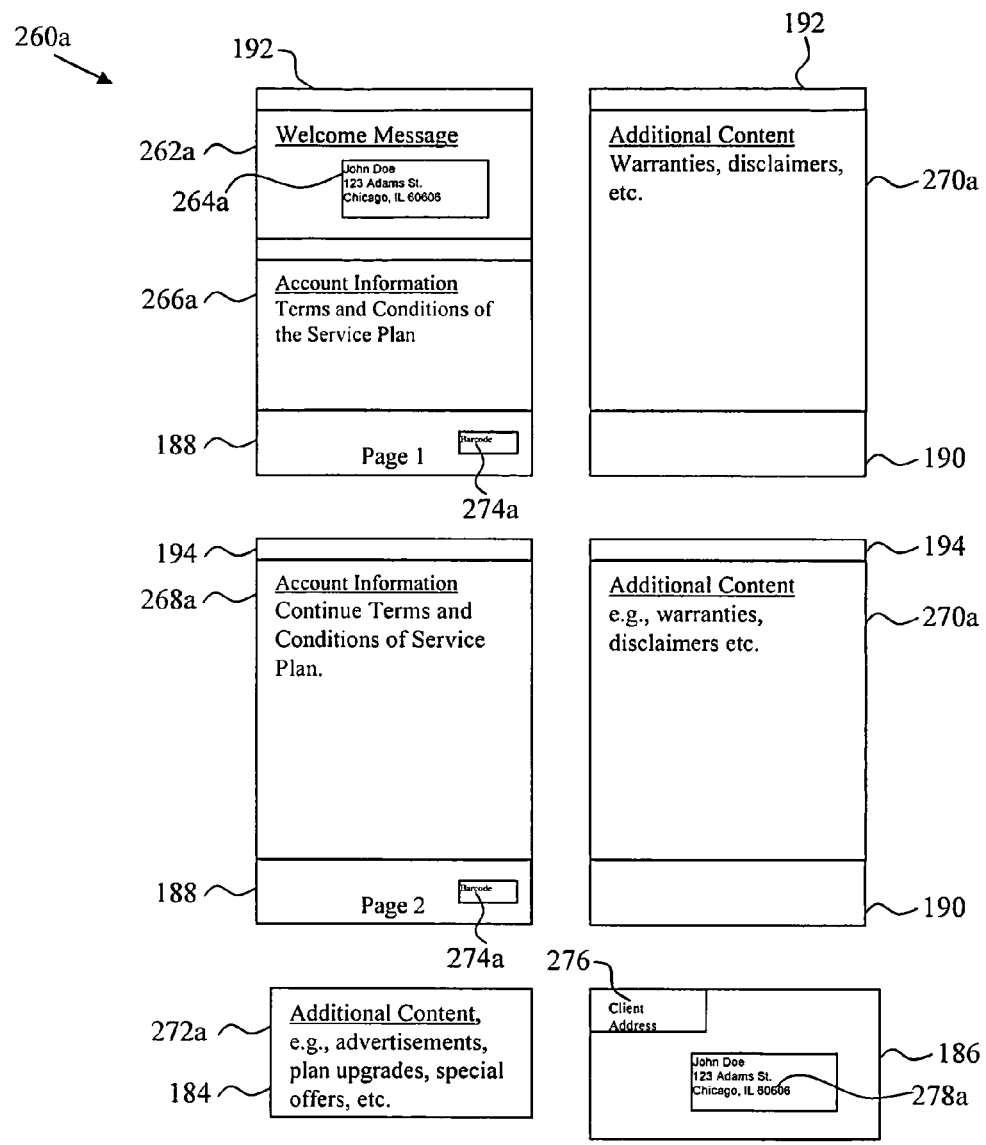
FIG. 10A is an elevational view of an embodiment of a print version of a variable document for a first recipient.
Figure 10B:
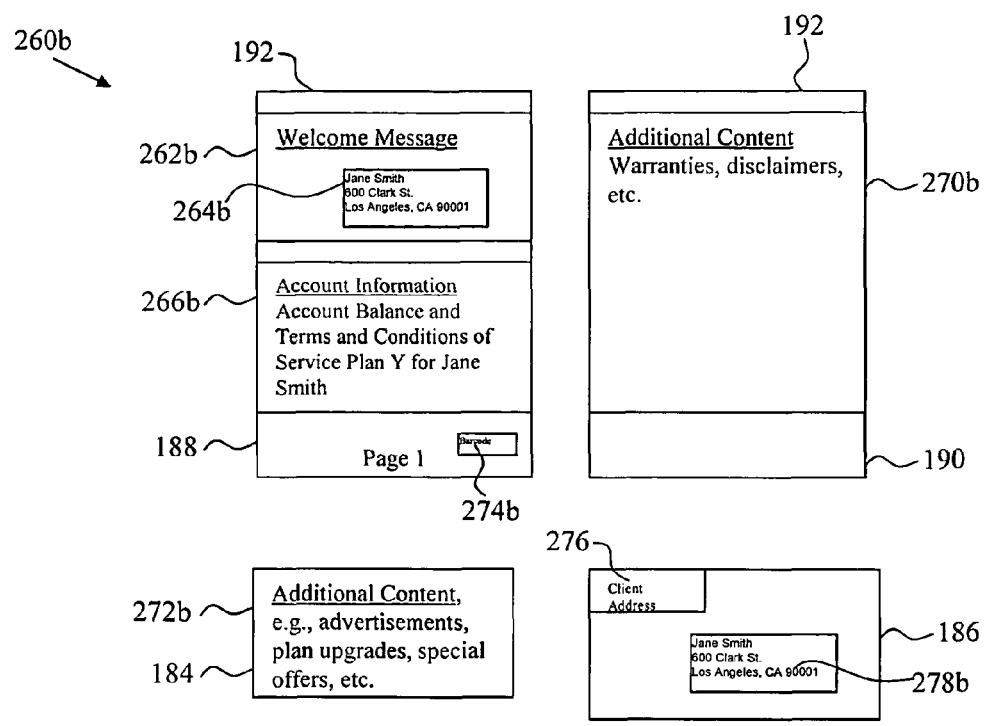
FIG. 10B is an elevational view of a print version of the variable document of FIG. 10A for a second recipient.

FIGS. 10A and 10B illustrate print versions 260a, 260b of the welcome kit that corresponds to the variable template 180 of FIG. 9 and the PDF files 140a, 140b of FIGS. 8A and 8B, respectively. In FIG. 10A the print version 260a is customized for John Doe. In particular, the placeholder 198 for the rasterized image of the "Welcome" portion 150 has been replaced by a rasterized image 262a of the "Welcome" portion 150a for John Doe. The placeholder 206 for the mailing address has been replaced by a rasterized image 264a of John Doe's name and address. In particular, John Doe's address in the rasterized image 264a has been normalized, wherein the corresponding city and state information, i.e., Chicago, Ill., has been included with the ZIP Code 60606. The placeholder 202 for the rasterized image of the first "Account Information" portion 152 has been replaced by a rasterized image 266a of the first "Account Information" portion 152a for John Doe. The placeholder 210 for the rasterized image of the second "Account Information" portion 154 has been replaced by a rasterized image 268a of the second "Account Information" 154a for John Doe. Each of the placeholders 214 for the rasterized image of the first "Additional Content" portion 156 has been replaced by a rasterized image 270a of the first "Additional Content" portion 156a for John Doe, e.g., warranties and disclaimers. Additionally, the placeholder 220 on the insert 184 for the rasterized image of the second "Additional Content" portion 158 has been replaced by a rasterized image 272a of the second "Additional Content" portion 158a for John Doe, e.g., advertisements, plan upgrades, and special offers. Further, the placeholders 218, 224, and 228 for variable data have been replaced by barcodes 274a, the client address 276, and John Doe's name and normalized address 278a, respectively.

In FIG. 10B, the print version 260b is customized for Jane Smith. In particular, the placeholder 198 for the rasterized image of the "Welcome" portion 150 has been replaced by a rasterized image 262b of the "Welcome" portion 150b for Jane Smith. Like the print version 260a in FIG. 10A, the placeholder 206 for the mailing address has been replaced by a rasterized image 264a of Jane Smith's name and address. In particular, Jane Smith's address in the rasterized image 264b has been normalized, wherein the corresponding city and state information, i.e., Los Angeles, Calif., has been included with the ZIP Code 90001. The placeholder 202 for the rasterized image of the first "Account Information" portion 152 has been replaced by a rasterized image 266b of the first "Account Information" portion 152b for Jane Smith. The placeholder 214 for the rasterized image of the first "Additional Content" portion 156 has been replaced by a rasterized image 270b of the first "Additional Content" portion 156b for Jane Smith, e.g., warranties and disclaimers. The placeholder 210 for the rasterized image of the second "Account Information" portion 154 does not correspond to a second "Account Information" portion for Jane Smith. Consequently, the second page 194 is omitted in the print version 260b of the welcome kit for Jane Smith. Additionally, the placeholder 220 on the insert 184 for the rasterized image of the second "Additional Content" portion 158 has been replaced by a rasterized image 272b of the second "Additional Content" portion 158b for Jane Smith, e.g., advertisements, plan upgrades, and special offers. Further, the placeholders 218, 224, and 228 for variable data have been replaced by barcodes 274b, the client address 276, and Jane Smith's name and normalized address 278b, respectively.

In other embodiments, the electronic versions 30, the variable template 180, and the print versions 32 can be modified in any manner that would be apparent to one of ordinary skill in the art without deviating from the principles described herein.

Figure 11:
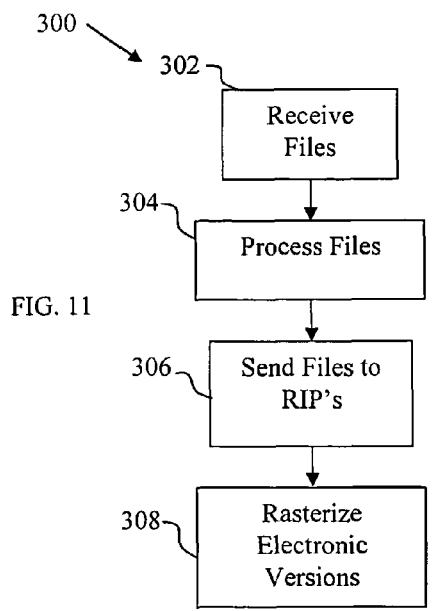
FIG. 11 is a flowchart according to a first embodiment that demonstrates the processes performed by the system of the present disclosure.

FIG. 11 illustrates a flow chart 300 of processes executed by the host server 26 to process electronic versions 30 of the welcome kit for recipients 24. At a block 302, the host server 26 receives electronic files, such as the electronic files 46 of FIG. 3. In the present embodiment, the electronic files 46 are received from the client 22 as one or more compressed files 52, which include a PDF file 140 for each of the electronic versions 30 of the welcome kit for a plurality of recipients 24 and an index file 48 that contains variable information for each recipient 24. In one embodiment, the client 22 accumulates the welcome kits for the plurality of recipients 24 over a period of time or until a predetermined number of welcome kits have been accumulated. The period of time can range from a few minutes to an hour, a day, a week, or longer, and the number of accumulated welcome kits can also vary greatly, e.g., from one to thousands or more. The client 22 sends the electronic versions 30 of the accumulated welcome kits to the host server 36, which receives the electronic versions at the block 302. In a different embodiment, the client 22 sends each electronic version 30 to the host server 26 as it is generated. In this embodiment, each electronic file 30 may be associated with information about the respective recipient 24 or an index file 48 for a plurality of recipients 24 can be sent periodically to the host server 26. The electronic versions 30 alternatively can be sent to the host server 36 is any manner known to those skilled in the art.

During the block 302, the host server 26 can also receive the job ticket 50 submitted by the client 22. In the present embodiment, the job ticket 50 includes a production schedule. The production schedule can specify a predetermined time at which to initiate the print run for the batch of recipients 24 or can specify a predetermined number of electronic versions 30 to process before initiating the print run. In a different embodiment, the job ticket 50 is not received by the host server 26 at the block 302. Instead, the requirements of the print versions 32 and/or the production schedule are provided to the host server 26 in any other manner apparent to one of ordinary skill in the art.

Next, control passes to a block 304 where the host server 26 processes the files received from the client 22. In the present embodiment, the host server 26 extracts the contents of the compressed file 52, e.g., the PDF files 140 and the index file 48. In one embodiment, the host server 26 also populates a database with information from one or more index files 48 as the index files are received by the host server 26. The database can be used later to generate the LDF 58 for a batch of recipients 24, as will be described in more detail hereinafter. Alternatively, the one or more index files 48 can be used to generate the LDF 58 without the host server populating a separate database. At the block 304, the host server 26 can also preflight the print versions 32 of the welcome kit by checking the information in the index file 48 and the PDF files 140 to ensure that the information is correct and that each of the necessary PDF files is present, valid, correctly formatted, and of the desired type. Further, the host server 26 can check for duplicate recipients 24 and/or electronic versions 30 of the welcome kits and make appropriate reports to the client 22.

After the host server 26 has processed the files at the block 304, control passes to a block 306, and the host server 26 sends the processed files to one or more RIP's 40. In particular, at the block 306, the host server 26 sends the extracted PDF files 140 to the RIP(s) 40. In order to optimize use of multiple RIP's 40 and balance the loads sent to the RIP's, the host server 26 divides the PDF files 140 amongst the RIP's and/or sends the PDF files to the RIP's as they become available. Other scheduling algorithms known in the art can be used to select the RIP's 40 that are used to rasterize the PDF file 140. In another embodiment, additional RIP's can be integrated dynamically into the process to decrease the time to rasterize a plurality of electronic versions 30 and the host server 26 can manage the RIP's to balance the loads sent to each.

At a block 308, the RIP(s) 40 rasterize the files sent at the block 306 into rasterized images 54. In the present embodiment, the RIP(s) 40 rasterize only relevant portions of the extracted PDF files 140. For example, with reference to FIGS. 8A and 8B, the RIP(s) 40 rasterize only the portions containing content and ignore the empty white space 160. In addition, the RIP(s) 40 can rasterize separately different portions of each page, e.g., the "Welcome" portion 150 and the first "Account Information" portion 152 can be rasterized into separate rasterized images 54. Consequently, the rasterized images 54 can be laid out selectively in any order in the print versions 32 of the welcome kit. During the block 308, the rasterized images 54 are stored in a local memory 44b associated with the RIP 40 that generated the rasterized image. In this manner, the processing storage requirements for a plurality of welcome kits can be distributed between multiple RIP's 40. In addition, at the block 308, the RIP 40 that rasterizes the PDF file 140 generates a GUID 56 for each rasterized image 54 that results from the rasterization. For example, referring to the PDF file 140a of FIG. 8A, a RIP 40 can rasterize each portion 150a-158a of the PDF file into a separate rasterized image 54, each of which is assigned a GUID 56. The GUID 56 identifies uniquely each rasterized image 54 and identifies the RIP 40 where the rasterized image is stored. Further, at the block 308, the RIP(s) 40 send the GUID's 56 for all of the rasterized images 54 to the host server 26, which maintains a database of the GUID's that is stored in the local memory 44a. In an alternative embodiment, instead of the RIP(s) 40 generating the GUID's 56 and sending the GUID's to the host server 26, the GUID's are stored by the host server as they are generated. In other embodiments, the GUID's 56 can be generated and stored in any manner that would be apparent to one of ordinary skill in the art.

Figure 12:
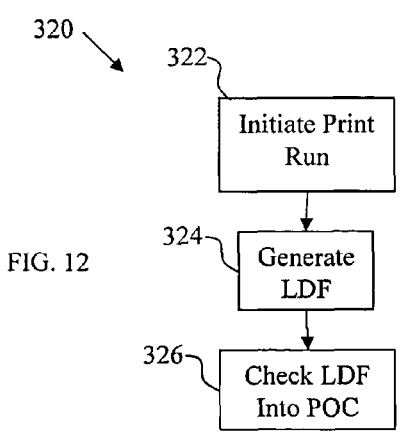
FIG. 12 is a flowchart according to a second embodiment that demonstrates the processes performed by the system of the present disclosure.

FIG. 12 illustrates a flow chart 320 of processes executed by the host server 26 to initiate a print run for a batch of recipients 24 and to generate a run instance or an LDF 58 for the print run. At a block 322 the print run for the batch of recipients 24 is initiated. The block 322 can initiate the print run at a time specified in the job ticket 50 described above. For example, the job ticket 50 can specify that the host server 26 should initiate a print run at 7:00 AM each day or after 5,000 electronic versions 30 of the welcome kit have been processed and rasterized. Alternatively, the time to initiate a print run can be preconfigured into the host server 26. The batch of recipients 24 can correspond to a subset of recipients in a single compressed file 52 or a superset of recipients in multiple compressed files. More importantly, the electronic versions 30 for each of the recipients 24 in the batch have already been rasterized and assigned GUID's 56.

At the appropriate time, the block 322 initiates the print run and control passes to a block 324 where the host server 26 generates the LDF 58 for the print run. The host server 26 generates the LDF 58 from the database populated with information in the one or more index files 48 or directly from the one or more index files and from the GUID's 56 managed by the host server. In the present embodiment, the LDF 58 includes an entry for each recipient 24 in the batch. As discussed above, each entry in the LDF 58 includes variable information specific to that recipient 24, e.g., a name and an address, and the GUID's 56 of the rasterized images 54 for that recipient. In one embodiment, the GUID's 56 in the LDF 58 are listed in the order they are to be printed, i.e., in a printer spread order, with blanks inserted as necessary, e.g., the LDF entry for Jane Smith discussed above would have a blank inserted for the second "Account Information" portion 156. However, in other embodiments, the entries in the LDF 58 can be listed in any order. After the LDF is created 58, control passes to a block 326 and the LDF 58 is checked into the POC system 28.

The processes of the flow chart 320 of FIG. 12 are independent of the processes of the flowchart 300 of FIG. 11. More specifically, the receipt and processing of the electronic files 46 and the rasterization of the electronic versions 30 according to the blocks 302-308 of FIG. 11 are performed without interruption by the initiation of the print run in FIG. 12. For example, if the host server receives 900 electronic versions 30 and 500 of the electronic versions have been rasterized when the print run is initiated at the block 322 of FIG. 12, then the host server 26 will initiate the print run for the batch of 500 recipients while the remaining 400 electronic versions continue to be processed and rasterized. As a result, the use of the RIP(s) 40 and the print server and presses 42 can be optimized.

Figure 13:
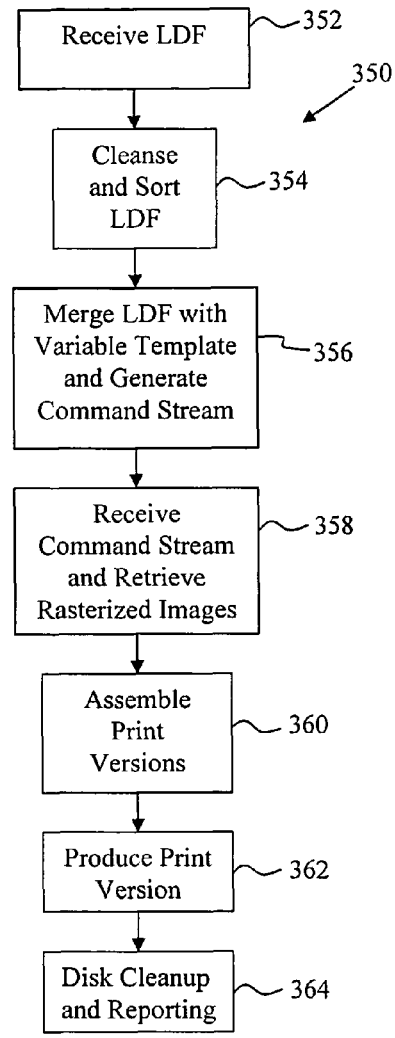
FIG. 13 is a flowchart according to a third embodiment that demonstrates the processes performed by the system of the present disclosure.

FIG. 13 illustrates a flow chart 350 of processes executed by the POC system 28 and the print server 42 to produce the print versions 32 for the batch of recipients 24. At a block 352, the POC system 28 receives the LDF 58 from the host server 26. Next, a block 354 cleanses and/or sorts the information in the LDF 58. The addressing information in the LDF 58 can be cleansed by normalizing each address in accordance with standard addressing formats defined by the U.S. Postal Office, e.g., by designating a city and a state that corresponds to a ZIP Code. In addition, the entries in the LDF 58 may be sorted in accordance with carrier routes, e.g., by ZIP Code, so that the print versions 32 can be printed in a presorted order in preparation for delivery to the recipients 24. In one embodiment, the production pipeline controller 76 and, more specifically, the data processing engine 78 described above in FIG. 5 performs the cleansing and sorting steps of the block 354.

Next, control passes to a block 356 and the POC system 28 merges the cleansed and sorted LDF 58 with a variable template and generates the command stream 60. As discussed above, the LDF 58 includes an entry for each recipient 24, wherein each entry includes variable information and the GUID's 56 of the rasterized images 54 for that recipient. Additionally, the variable template, such as the variable template 180 in FIG. 8, defines the layout of the print versions 32 of the welcome kit and includes placeholders for the rasterized images 54 and for variable data. The placeholders for rasterized images 54 reference fields in the LDF 58 that identify the GUID's 56 for the corresponding rasterized images for each recipient 24. Similarly, the placeholders for variable data reference fields in the LDF 58 that identify other variable information, e.g., name and address, for each recipient 24. At the block 356, the merge task replaces the placeholders with the referenced GUID's 56 and the other variable information for each recipient in the LDF 58 to generate instructions for assembling the print versions 32 of the welcome kit for that recipient 24. The POC system 28 assembles the instructions for each recipient 24 into the command stream 60. In one embodiment, the beginning of the command stream 60 includes a list of the GUID's 56 for all of the rasterized images 54 that are required for the print versions 32 for the recipients 24. In one embodiment, the production pipeline controller 76 and, more specifically, the generation engine 80, the first and second translation engines 82, 86, respectively, and the enhancement engine 84 described above in FIG. 5 perform the merging and generating steps of the block 356.

Next, at the block 358 the print server 42 receives the command stream 60 from the POC system 28 and uses the GUID's 56 listed in the command stream to locate the corresponding rasterized images 54. Each rasterized image 54 is retrieved from the RIP 40 where it is stored and saved in the local memory 44d associated with the print server 42. At a block 360, the print versions 32 of the welcome kit for the recipients 24 are assembled from the retrieved rasterized images 54 and the command stream 60. At the block 360, only the variable data, e.g., variable text and barcodes, need to be rasterized to assemble the print versions 32. In the present embodiment, the required fonts for the variable text have already been rasterized and stored locally to the print server 42. Consequently, the rasterization of the variable data involves assembling the correct characters in the designated fonts for the variable text and rasterizing the barcode, for example. In other embodiments, the fonts also need to be rasterized at the block 360 to assemble the print versions 32. In either case, the bulk of the print versions 32 of the welcome kit have already been rasterized, i.e., the rasterized images 54 generated from the electronic versions 30, and the rasterization of the variable data would take a negligible amount of time in comparison. Next, at a block 362, the assembled print versions 32 are sent to the print server and one or more presses 42 and the print versions 32 of the welcome kits are produced.

Following the production of the print versions 32, a block 364 uses the GUID's 56 in the command stream 60 to identify the rasterized images 54 used to assemble the print versions 32. The identified rasterized images 54 are removed from the local memories 44b, 44d associated with the POC system 28 and the RIP's 40, respectively. At the block 364, the GUID's 56 are also deleted after the rasterized images 54 are removed. Further, at the block 364 a report is generated that includes details of the welcome kits produced, e.g., the number of welcome kits produced and the recipients of the welcome kits. In addition, the report can identify errors encountered during the processing of the welcome kits and duplicates identified during the cleansing process. Alternatively, the removal of the rasterized images 54 can be performed after the print versions 32 are assembled at the block 360.

In other embodiments, multiple clients 22 send electronic versions 30 of different variable documents, e.g., welcome kits, invoices, periodic statements, advertisements, and the like, to different recipients. In such embodiments, one or more host servers 26, POC systems 28, and print servers 42 process the electronic versions and produce the print versions according to the principles described herein.

INDUSTRIAL APPLICABILITY

The systems and methods described herein advantageously process electronic versions of a variable document to produce print versions of the variable document. The electronic versions are processed to generate rasterized images. At a specified time, a print run is initiated and a command stream is generated for the print run. The command stream includes instructions for assembling the print versions of the variable document from the stored rasterized images. The print versions are assembled in accordance with the command stream and produced on one or more presses.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:
1. A method of processing electronic documents for a plurality of recipients, comprising the steps of:
   receiving a plurality of electronic documents for the plurality of recipients, wherein each electronic document is associated with one of the plurality of recipients and includes first variable information associated with the recipient thereof;
   rasterizing each of the plurality of electronic documents into one or more rasterized images, wherein each rasterized image is assigned a unique identifier;
   generating a run instance for the plurality of recipients, wherein the run instance includes the unique identifiers of the one or more rasterized images and second variable information associated with each recipient;
   merging the run instance with a template to generate a command stream; and
   assembling a print version of each of the plurality of electronic documents in accordance with the command stream and the rasterized images identified by the unique identifiers, wherein the print version of the electronic document associated with a recipient includes the second variable information associated with such recipient instead of the first variable information associated with the recipient.

2. The method of claim 1, further comprising the steps of storing each rasterized image at a raster image processor that generated the rasterized image, wherein each unique identifier specifies where the corresponding rasterized image is stored, and retrieving the stored rasterized images in accordance with the unique identifiers associated therewith and wherein the assembling step assembles the print versions of the plurality of electronic documents from the command stream and the retrieved rasterized images.

3. The method of claim 1, further comprising the step of receiving a job ticket, wherein the job ticket specifies when to initiate the generating step.

4. The method of claim 1, wherein the step of rasterizing is performed independently of the step of generating the run instance for the batch of recipients.

5. The method of claim 1, wherein a beginning portion of the command stream includes a list of the unique identifiers.

6. The method of claim 1, further comprising the steps of receiving second variable information for the recipients and incorporating the second variable information into the assembled print versions.

7. The method of claim 6, further comprising the step of receiving a compressed file, wherein the compressed file includes the electronic documents and an index file that includes the second variable information.

8. The method of claim 6, further comprising the steps of preflighting the electronic documents before the step of rasterizing and cleansing the second variable information before the step of assembling.

9. The method of claim 1, further comprising the steps of generating instructions for a press to produce the assembled print versions and producing the print versions on one or more presses using the generated instructions.

10. The method of claim 9, further comprising the steps of identifying the rasterized images used to assemble the print versions and removing the identified rasterized images and the corresponding unique identifiers, and wherein the steps of identifying and removing are performed after the step of producing.

11. The method of claim 1, wherein each unique identifier identifies a stored rasterized image and optionally identifies a page or portion corresponding to the rasterized image.

12. A system for processing electronic documents for a plurality of recipients, comprising:
a server adapted to receive a plurality of electronic documents for the plurality of recipients, wherein each electronic document is associated with one of the plurality of recipients and includes first variable information for associated with the recipient thereof;
one or more raster image processors adapted to rasterize the electronic documents into one or more rasterized images, wherein each rasterized image is assigned a unique identifier,
wherein the server is adapted to generate a live data file wherein the live data file includes the unique identifiers of the rasterized images and second variable information associated with each recipient;
a print job management system adapted to merge the live data file with a template to generate a command stream; and
a print server adapted to assemble print versions of the electronic documents in accordance with the command stream and the rasterized images identified by the unique identifiers, wherein the print version of an electronic document associated with a recipient includes the second variable information associated with such recipient instead of the first variable information for the recipient.

13. The system of claim 12, wherein the server is adapted to balance loads sent to a plurality of raster image processors and to integrate dynamically one or more additional raster image processors, as needed, to rasterize the electronic documents.

14. The system of claim 12, wherein the print server retrieves the rasterized images in accordance with the unique identifiers and assembles the print versions of the electronic documents from the command stream and the retrieved rasterized images.

15. The system of claim 12, wherein the print job management system merges second variable information associated with each of the plurality of recipients with the live data file and the template to generate the command stream.

16. The system of claim 12, wherein the unique identifier is a uniform resource identifier or an entry that identifies a location where the rasterized image is stored and a path name of the rasterized image.

17. A method of processing electronic documents for a plurality of recipients, comprising the steps of:
receiving a plurality of electronic documents for the plurality of recipients, wherein each electronic document is associated with one of the plurality of recipients and includes first variable information associated with the recipient thereof;
rasterizing each of the electronic documents into one or more rasterized images, wherein each rasterized image is assigned a unique identifier;
receiving second variable information associated with each of the plurality of recipients;
generating a run instance, wherein the run instance includes the unique identifiers of the one or more rasterized images;
assembling a print version of each of the plurality of electronic documents in accordance with the run instance, a template, and the rasterized images, wherein the print version of the electronic document for each recipient includes the second variable information associated with such recipient instead of the first variable information for the recipient.

18. The method of claim 17, further comprising the steps of storing each rasterized image at a raster image processor, wherein each unique identifier specifies where the corresponding rasterized image is stored, and retrieving the stored rasterized images in accordance with the unique identifiers associated therewith, and wherein the assembling step assembles the print version of each of the plurality of electronic documents from the retrieved rasterized images.

19. The method of claim 17, further comprising the step of receiving a job ticket, wherein the job ticket specifies when to initiate the generating step.

20. The method of claim 17, wherein the step of rasterizing is performed independently of the step of generating the run instance for the batch of recipients.

21. The method of claim 17, further comprising the steps of receiving a compressed file, wherein the compressed file includes the electronic documents and an index file that includes the second variable information, preflighting the electronic documents before the step of rasterizing, and cleansing the second variable information before the step of assembling.

22. A system for processing electronic documents for a plurality of recipients, comprising:
a server adapted to receive a plurality of electronic documents associated with the plurality of recipients, wherein each electronic document is associated with one of the plurality of recipients and includes first variable information associated with the recipient thereof;
one or more raster image processors adapted to rasterize the electronic documents into one or more rasterized images, wherein each rasterized image is assigned a unique identifier,
wherein the server is adapted to receive second variable information and to generate a live data file wherein the live data file includes the unique identifiers of the rasterized images;
a print job management system adapted to merge the live data file with the first variable information associated with each of the plurality of recipients and a template to generate a command stream; and
a print server adapted to assemble print versions of the plurality of electronic documents in accordance with the command stream and the rasterized images identified by the unique identifiers, wherein the print version of the electronic document for each recipient includes the second variable information associated with such recipient instead of the first variable information associated with the recipient.

23. The system of claim 22, wherein the rasterization of the electronic documents for the plurality of recipients is performed independently of the generation of the live data file for the batch of recipients.

24. The system of claim 22, wherein the print server retrieves the rasterized images in accordance with the unique identifiers and assembles the print versions of the electronic documents from the command stream and the retrieved rasterized images.

25. The system of claim 22, wherein the server is adapted to balance loads sent to a plurality of raster image processors and to integrate dynamically one or more additional raster image processors, as needed, to rasterize the electronic documents.

* * * * *